Sept. 5, 1950            D. PHELPS            2,521,088
SHIPPING CONTAINER AND METHOD OF TRANSPORTING VEHICLES
Filed Aug. 16, 1946            2 Sheets-Sheet 1
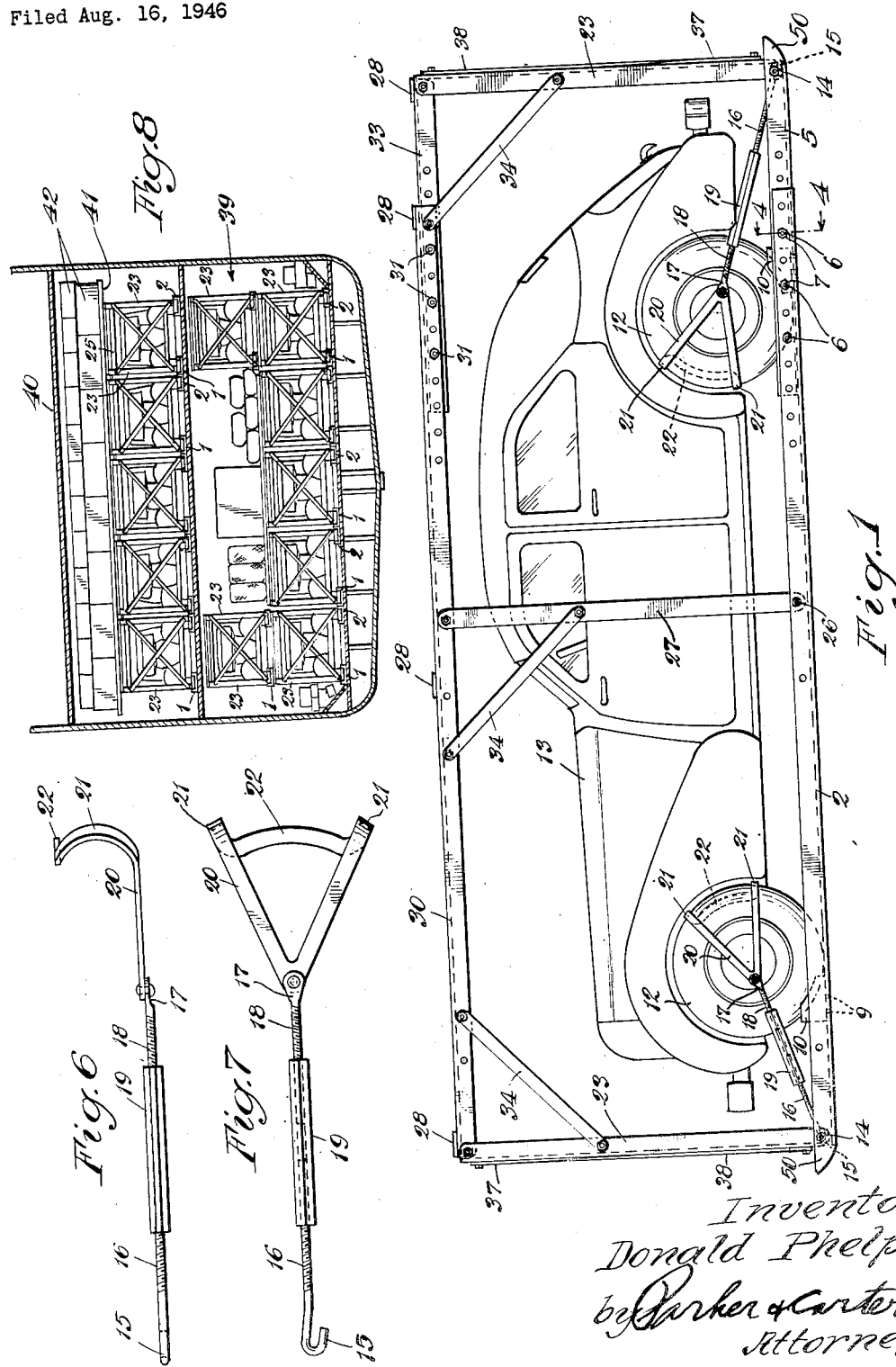
Inventor
Donald Phelps
by Parker & Carter
Attorneys Sept. 5, 1950      D. PHELPS      2,521,088
SHIPPING CONTAINER AND METHOD OF TRANSPORTING VEHICLES
Filed Aug. 16, 1946      2 Sheets-Sheet 2
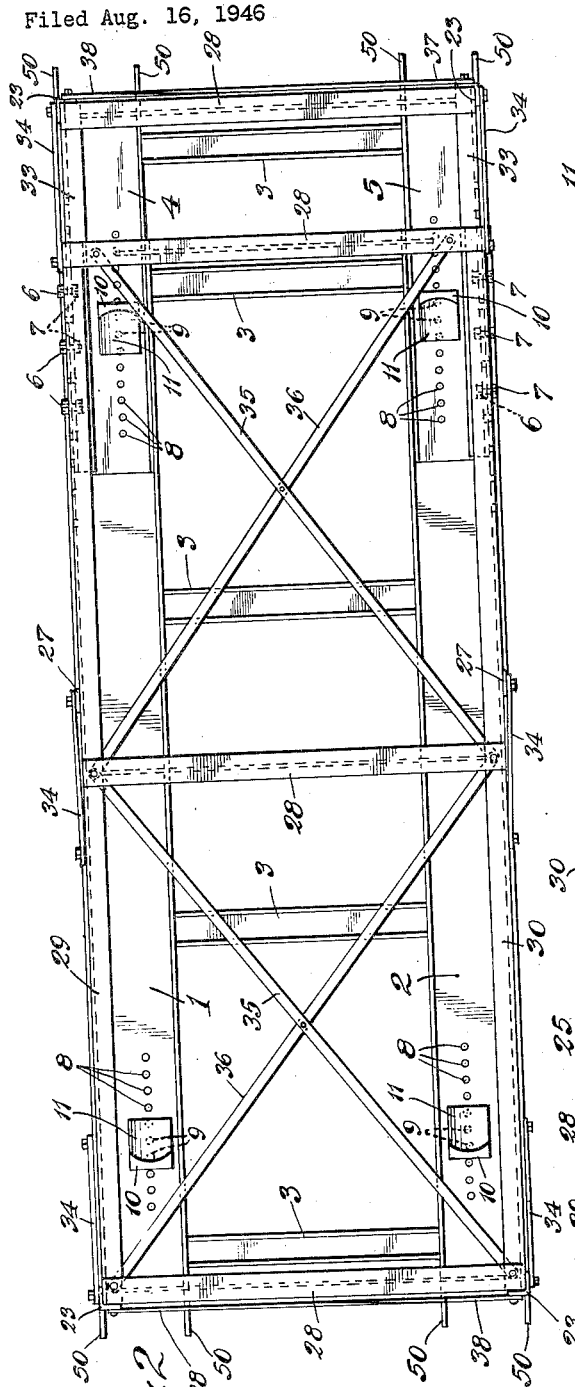
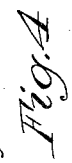
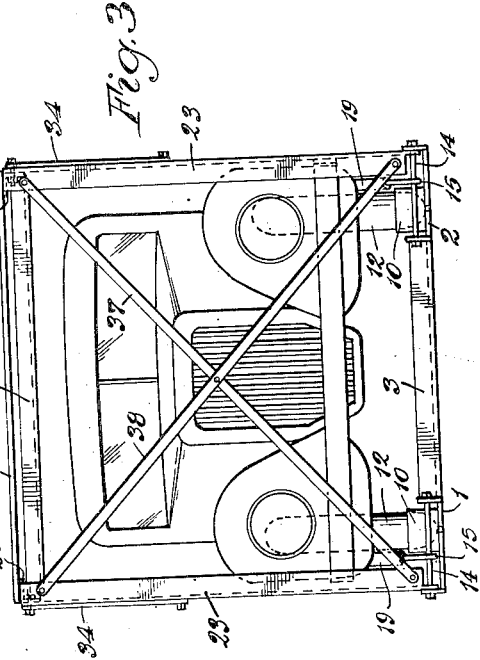
Inventor
Donald Phelps
by Parker & Carter
Attorneys Patented Sept. 5, 1950

2,521,088

UNITED STATES PATENT OFFICE 2,521,088

SHIPPING CONTAINER AND METHOD OF TRANSPORTING VEHICLES

Donald Phelps, Chicago, Ill.

Application August 16, 1946, Serial No. 691,128

2 Claims. (Cl. 206—46)

My invention relates to improvements in shipping containers and method of transporting vehicles, and has for one object to provide new and improved equipment for shipment of unboxed automobiles and the like.

The shipment of unboxed automobiles and the like by sea has become a very serious problem. When the vehicle is demounted, wheels taken off, etc., and it is shipped in a box, it can be handled just as ordinary ocean freight is handled. However, there is a great demand for shipment of unboxed vehicles because of the saving in expense in demounting, boxing, unboxing and reassembling.

The dimensions of ocean vessels are fixed, and they seldom exactly fit, especially when limited to 'tween-decks where such vehicles are ordinarily placed. The automobile must be rolled into place, expensive and complicated blocking and chocking built to hold it in place and because of its delicacy, the automobile is subject to damage by other shipments and cannot be readily associated with them. In lower holds or in single-deck vessels, automobiles are seldom stored unboxed and only then with severe loss of shipping space.

I propose to build a demountable container adjustable in length to take care of vehicles of various lengths but of standard width and height. This container will enclose the vehicle and will be provided with convenient anchoring means whereby the vehicle can be held in place in the ship, and the container will be of such strength and size that a series of containers can be fastened together in 'tween-decks or lower holds and dunnage may be placed alongside or above them upon which other freight may be placed. Thus making it possible to use the maximum efficiency of the space in the ship.

On the return voyage, the container may be easily demounted so as to require a minimum amount of space, and its weight will be less than, or at least no greater than, the weight of the amount of timber necessary to build the temporary arrangement for holding the unboxed automobiles in place.

My invention is illustrated more or less diagrammatically in the accompanying drawings, wherein:

Figure 1 is a side elevation of the container showing an automobile rigidly held therein;

Figure 2 is a plan view of Figure 1 with the automobile and other parts omitted;

Figure 3 is a view of the container showing the automobile in place;

Figure 4 is a section on an enlarged scale on the line 4—4 of Figure 1;

Figure 5 is a perspective view of one of the adjustable wheel and chocks used with the container;

Figure 6 is a plan view of one of the adjustable wheel holding chocks;

Figure 7 is a side elevation of Figure 6; and

Figure 8 is a section through a ship showing my container in use.

Like parts are indicated by like symbols throughout the specification and drawings.

1, 2 are a pair of track channels connected by a plurality of rigid cross members 3. 4, 5 are channel extensions slidable respectively in the track channels 1 and 2 or other means of extensions. The flanges of channels 1, 2, 4, 5, being apertured to receive holding bolts 6 and nuts 7, whereby the effective overall length of the track channels may be adjusted to compensate for differences in vehicle lengths.

The channels 1, 2, 4, 5 are centrally apertured at 8 at the opposite ends of the container to be engaged by pins 9 on the bottom of the chock blocks 10. The chock blocks have smooth plane bottom surfaces adapted to rest on the web of any one of the channels 1, 2, 4, 5 and curved inclined surfaces 11 adapted to engage the tire 12 of the automobile 13.

Bolts 14 pass through apertures in both flanges of the channels 1, 2, 4, 5; at the outer ends thereof engaging these bolts 14 are hooks 15 threaded at 16. In opposition to these hooks are links 17 threaded at 18 in opposition to the thread 16. The threads 16 and 18 penetrate a rotatable turnbuckle sleeve 19. Pivoted on each link 17 is a Y member 20. Both branches of the Y being curved as at 21 to engage the tire 12. The outer tire engaging curved ends being joined by curved segment 22 to engage the inner side of the tire.

When an automobile is rolled onto the tracks 1, 2, 4, 5, the chocks are put in proper place with each automobile wheel engaging a chock. The yokes shown in Figures 6 and 7 may then be put in place engaging the wheel in opposition to the chock; the turnbuckle sleeve rotated to exert pressure to seat each wheel firmly against the chock and the channel. Under these circumstances, the four automobile wheels being rigid on the axle will be held with the axle rigidly in place in the container, which experience has taught is a sufficient anchorage for the automobile. It is not necessary to separately hold the chassis, engine and body in place; so long as the wheels and axles are firmly seated, the vehicle will remain in proper position. The springs of the vehicle, itself, being sufficient to hold it in that connection.

The mechanism thus far described would be sufficient to hold one and if assembled in groups a series of automotive vehicles in place with a minimum of delay, a minimum of expense and a minimum of man power. This would solve the problem of properly positioning the vehicle, but would not solve the problem of maximum space utilization. The mechanism for doing this will now be described.

Pivoted on the two pins 14 at one end of the tracks 1, 2 and at one end of the tracks 4, 5 is a rectangular framework which is made up of vertical angle pairs 23, the lower ends of which are apertured to engage the pins 14. The upper ends of the angles 24 are joined by horizontal cross members 25 intermediate with the ends of the tracks 1, 4 and 2, 5. Pivoted on bolts 26 in the outer flanges are vertical members 27. There may be one as indicated in Figure 1 or for longer vehicles, perhaps more.

Pivoted on the upper ends of the member 23 and 27 and extending toward the tracks 4, 5 but above them are two horizontal members 29 and 30. These members are of equal length of the track channels 1 and 2. They are apertured to receive bolts 31 to engage adjustable extensions 33 which extend out to and are pivoted on the rear vertical frame 23. The members 29, 30 and extensions 33 are joined by horizontal cross members 28 forming an upper frame. 34 indicates a plurality of diagonal braces joining the members 29 and 30 with the vertical members 23 and 27 so as to hold these members in upward position against angular displacement.

Fixed pairs of cross struts 35, 36 above the automobile in the same general plane as the members 29 and 30 extend between opposite upper extremities of the vertical frames. Similar cross members, omitted for the fact of clearness, may be used along the sides of the automobile.

Associated with each of the members 23 are diagonal cross struts 37, 38 as indicated in Figure 3. These rectangular frame members are removable to permit the automobile to enter the structure or, if desired, the whole vertical frame may be in alignment with the track channels 1, 2, 3, 5 and after the automobile is braced, may be rotated into position and the upper framework erected thereupon.

In Figure 8 is shown a plurality of these container frames assembled side by side in a ship resting on a between deck 39 below the upper deck 40. 41 indicates planking or dunnage placed upon the frame work enclosing the automobile adapted to support any suitable cargo 42. As indicated, if desired, the cargo can also be placed alongside of these frames being kept out of contact with the automobiles by the frame work.

These automobile supporting frames may also, if desired, be arranged end to end and fastened together. In every case, however, whether end to end or side by side or both, all of these separate structures when placed in a vessel will be attached together, thus being rigidly positioned to guarantee against displacement and insure a solid packing of the cargo with the single exception of the spring support connection of the automotive vehicle and the size of the automotive vehicle. The size of the frame work will be such that movement permitted by the springs will not exceed the clearance between the vehicle and the outer wall of the cell.

As suggested above, of course, under those circumstances where it is not necessary to associate other cargo with the automobiles, the channel supporting structure alone would be used.

It is not essential that the container for each automobile be attached to the other containers; they might be so loaded and the cargo might so fill the ship, that separate attachments of individual shipping containers could be dispensed with.

Extensions 50 on the ends of the channels may be provided if desired having curved surfaces to facilitate sliding along the deck or for inserting rollers.

I claim:

1. An automobile shipping container comprising a pair of parallel horizontally disposed channel members, cross members joining them and adapted to hold them in permanent parallelism and against relative longitudinal displacement, another pair of channel members slidably engaged each with one of the first-named members and means for rigidly holding the second pair of channel members against relative longitudinal and transverse displacement, means for adjustably attaching said pairs of members together, there being a movable wheel chock adjustably positioned in each of the four channels, a bridle associated with each of said chocks, means for tightening the bridle between the end of the channel and an automobile wheel whereby to hold each wheel separately in position against the chock with which it is associated.

2. An automobile shipping container comprising a pair of parallel horizontally disposed channel members, cross members joining them and adapted to hold them in permanent parallelism and against relative longitudinal displacement, another pair of channel members slidably engaged each with one of the first-named members and means for rigidly holding the second pair of channel members against relative longitudinal and transverse displacement, means for adjustably attaching said pairs of members together, there being a movable wheel chock adjustably positioned in each of the four channels, a bridle associated with each of said chocks, means for tightening the bridle between the end of the channel and an automobile wheel whereby to hold each wheel separately in position against the chock with which it is associated, a framework parallel with and spaced above the pairs of channels, pivot supports between the outer walls of the channels and the framework, the framework comprising two sections one corresponding to the first pair of channels, the other corresponding to the second and means for slidably adjusting said sections, removable means for preventing longitudinal displacement of the upper framework with respect to the channels.

DONALD PHELPS.

REFERENCES CITED

The following references are of record in the file of this patent:

UNITED STATES PATENTS

| Number | Name | Date |
|---|---|---|
| 909,615 | La Bauve | Jan. 12, 1909 |
| 1,086,670 | Jory et al. | Feb. 10, 1914 |
| 1,229,714 | Clark and Manning | June 12, 1917 |
| 1,661,439 | Michod | Mar. 6, 1928 |
| 1,770,798 | Nicholson | July 15, 1930 |
| 1,797,294 | McMullen | Mar. 24, 1931 |
| 1,900,867 | Olds | Mar. 7, 1933 |